(12) United States Patent
Pong

(10) Patent No.: US 8,166,127 B2
(45) Date of Patent: *Apr. 24, 2012

(54) APPARATUS AND METHODS FOR EFFICIENT INSERTION AND REMOVAL OF MPA MARKERS AND RDMA CRC DIGEST

(75) Inventor: Fong Pong, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 12/534,429

(22) Filed: Aug. 3, 2009

(65) Prior Publication Data

US 2010/0036930 A1 Feb. 11, 2010

Related U.S. Application Data

(63) Continuation of application No. 11/415,181, filed on May 2, 2006, now Pat. No. 7,571,259.

(51) Int. Cl.
*G06F 15/167* (2006.01)

(52) U.S. Cl. ......... 709/212; 709/220; 370/474; 714/758

(58) Field of Classification Search .................. 709/212, 709/220; 370/474; 714/758
See application file for complete search history.

(56) References Cited

U.S. PATENT DOCUMENTS

2005/0149817 A1* 7/2005 Biran et al. .................. 714/758
2007/0165672 A1* 7/2007 Keels et al. .................. 370/474

* cited by examiner

*Primary Examiner* — Tammy Nguyen
(74) *Attorney, Agent, or Firm* — Sterne, Kessler, Goldstein & Fox, P.L.L.C.

(57) ABSTRACT

The invention relates to insertion and removal of MPA markers and RDMA CRCs in RDMA data streams, after determining the locations for these fields. An embodiment of the invention comprises a host interface, a transmit interface connected to the host interface, and a processor interface connected to both transmit and host interfaces. The host interface operates under the direction of commands received from the processor interface when processing inbound RDMA data. The host interface calculates the location of marker locations and removes the markers. The transmit interface operates under the direction of commands received from the processor interface when processing outbound RDMA data. The transmit interface calculates the positions in the outbound data where markers are to be inserted. The transmit interface then places the markers accordingly.

26 Claims, 7 Drawing Sheets

APPARATUS AND METHODS FOR EFFICIENT INSERTION AND REMOVAL OF MPA MARKERS AND RDMA CRC DIGEST

CROSS-REFERENCE TO RELATED APPLICATIONS

This application is a Continuation of U.S. Non-Provisional Application No. 11/415,181, filed May 2, 2006, incorporated by reference herein in its entirety, and for which priority is claimed under 35 U.S.C. §120.

BACKGROUND OF THE INVENTION

1. Field of the Invention

The invention described herein relates to data communications and, in particular, direct memory access (DMA).

2. Related Art

Remote DMA (RDMA) is a technology for transferring data from the memory of one computer or server to the memory of another, without involving a CPU or operating system of either machine. Because the data being transferred is not stored in application memory or in operating system buffers, RDMA is said to accomplish the transfer in a "zero-copy" manner.

RDMA is typically implemented using a suite of three protocols—RDMA Protocol (RDMAP), Direct Data Placement (DDP) and Marker PDU Aligned Framing Protocol (MPA). RDMAP provides interfaces to applications for sending and receiving data. DDP slices outgoing data into segments that fit into TCP's Maximum Segment Size (MSS), and places incoming data into destination buffers. MPA provides a framing scheme that facilitates DDP operations in identifying DDP segments.

RDMA is a "shim", a transport protocol suite on top of TCP. RDMA leverages TCP rather than inventing its own protocols for flow control, routing, data sequencing and so on. In principle, an RDMA message can be too large to fit into one TCP segment.

MPA is a framing protocol. It adds a marker into the data stream at a stride of every 512 bytes in the TCP sequence space. Markers assist the receiver in locating the DDP/RDMA header.

Unfortunately, insertion and removal of MPA markers are not friendly operations. Inserting markers into a continuous data stream creates a disruptive shuffle of the data stream. Insertion and removal of a RDMA CRC (cyclic redundancy code) digest is also difficult to handle efficiently.

Therefore there is a need for a system and apparatus with which MPA markers and CRC digests can be easily inserted and removed during RDMA communications.

SUMMARY OF THE INVENTION

The invention described herein inserts and removes MPA markers and RDMA CRCs in RDMA data streams, after determining the locations for these fields. An embodiment of the invention comprises a host interface, a transmit interface connected to the host interface, and a processor interface connected to both transmit and host interfaces.

The host interface operates under the direction of commands received from the processor interface when processing inbound RDMA data. The host interface calculates the location of marker locations and removes the markers. CRCs are handled in a like manner.

The transmit interface operates under the direction of commands received from the processor interface when processing outbound RDMA data. The transmit interface calculates the positions in the outbound data where markers are to be inserted. The transmit interface then places the markers accordingly. CRCs are handled in a like manner.

Further embodiments, features, and advantages of the present invention, as well as the operation of the various embodiments of the present invention, are described below with reference to the accompanying figures.

BRIEF DESCRIPTION OF THE FIGURES

The accompanying drawings, which are incorporated herein and form a part of the specification, illustrate the present invention and together with the description further serve to explain the principles of the invention and to enable a person skilled in the pertinent art to make and use the invention. In the drawings, like reference numbers indicate identical or functionally similar elements. Additionally, the left-most digit of the reference number indicates a drawing in which the reference number first appears.

DETAILED DESCRIPTION OF THE INVENTION

An embodiment of the present invention is now described with reference to the figures. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

Introduction

Figure 1:
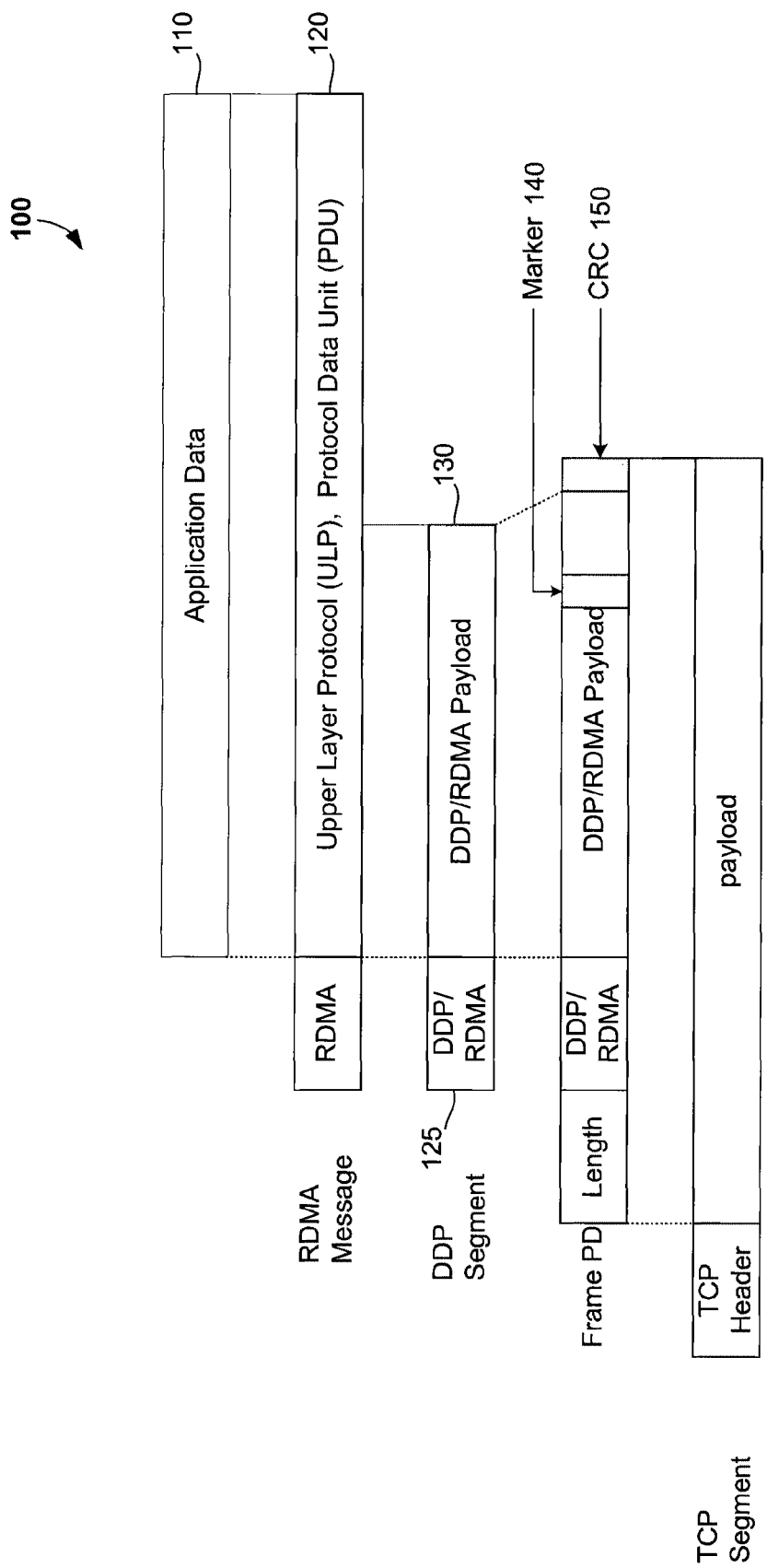
FIG. 1 illustrates the structure of RDMA communications in the context of the transmission control protocol.

FIG. 1 offers a schematic view of data framing with respect to RDMA. When an application issues a command for data transfer, RDMA considers all data 110 identified by the application when forming an RDMA message 120.

DDP is responsible for slicing a large RDMA message 120 into smaller segments, one of which is shown as segment 130. DDP/RDMAP prefixes each segment 130 with a DDP/RDMAP header 125. The header 125 combines RDMA control and DDP fields into a single header. The RDMA control field (not shown separately) specifies the RDMA operations. DDP fields (not shown separately) specify parameters such as the address of the destination buffers and the length of data transfer.

Especially when network packets may be received out-of-order, a receiver can use markers at fixed, known locations to quickly locate DDP headers. After recovering the DDP header, the receiver may place payload data into its destination buffer. Because each DDP segment is self-contained (in that the header includes a destination buffer address), quick data placement in the presence of out-of-order receive packets becomes feasible. This feature reduces the amount of memory required for buffering data at an adapter.

Figure 2:
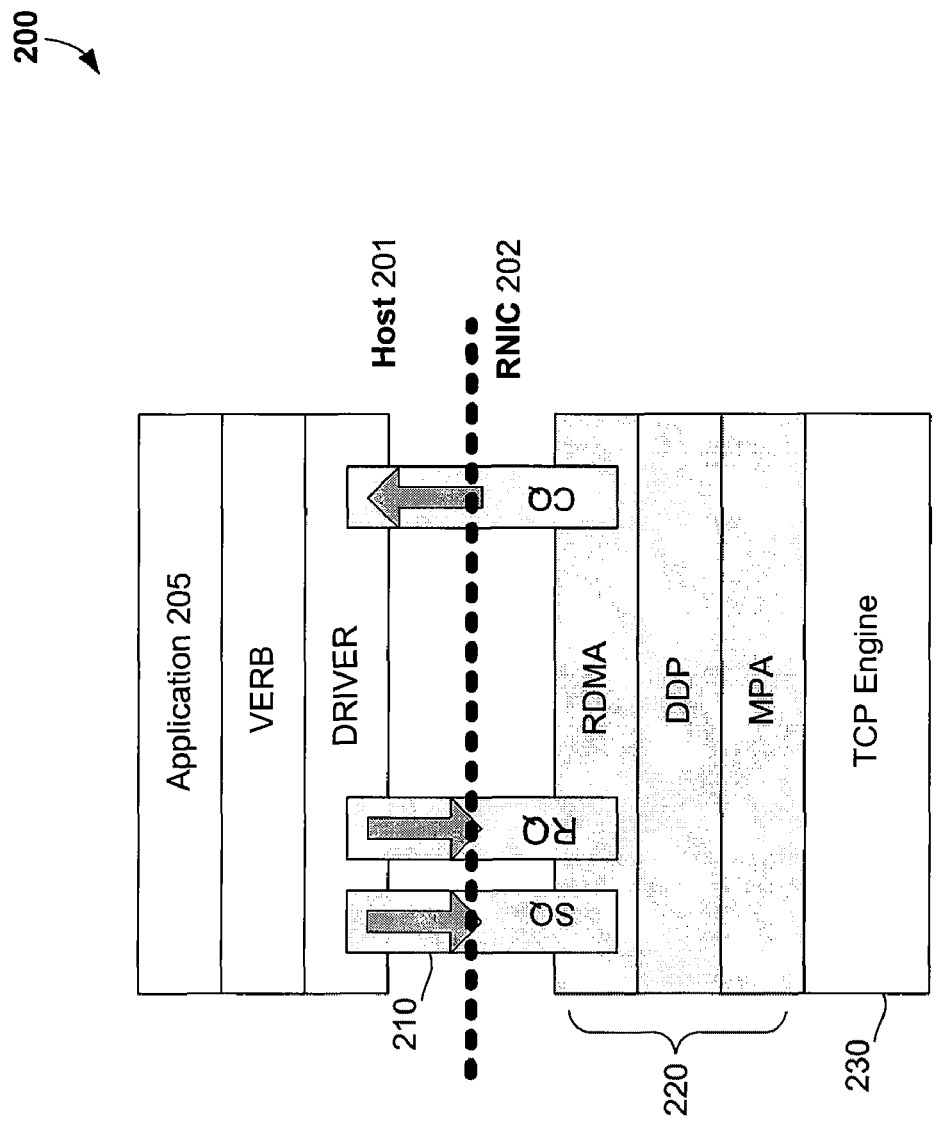
FIG. 2 illustrates the relationship between an RDMA—capable network interface card and a host, according to an embodiment of the invention.

FIG. 2 illustrates the interaction between an RDMA network interface card (RNIC) 202 and a host 201. When a host application 205 is to send data via an RDMA/TCP connection, the application 205 issues a transmit request 210 to the send queue (SQ). The command includes the amount of data to be sent. The RDMA protocol suite 220 is responsible for framing the data as shown in FIG. 1, prior to processing by a TCP engine 230.

Removing markers from received RDMA packets is equally difficult. Before the RNIC can store the data into the memory locations designated by the host application, the RNIC must remove the MPA markers.

Insertion and removal of a RDMA CRC (cyclic redundancy code) digest is also difficult to handle efficiently. As shown in FIG. 1, every framed protocol data unit (PDU) is appended with a CRC digest 150.

Figure 3:
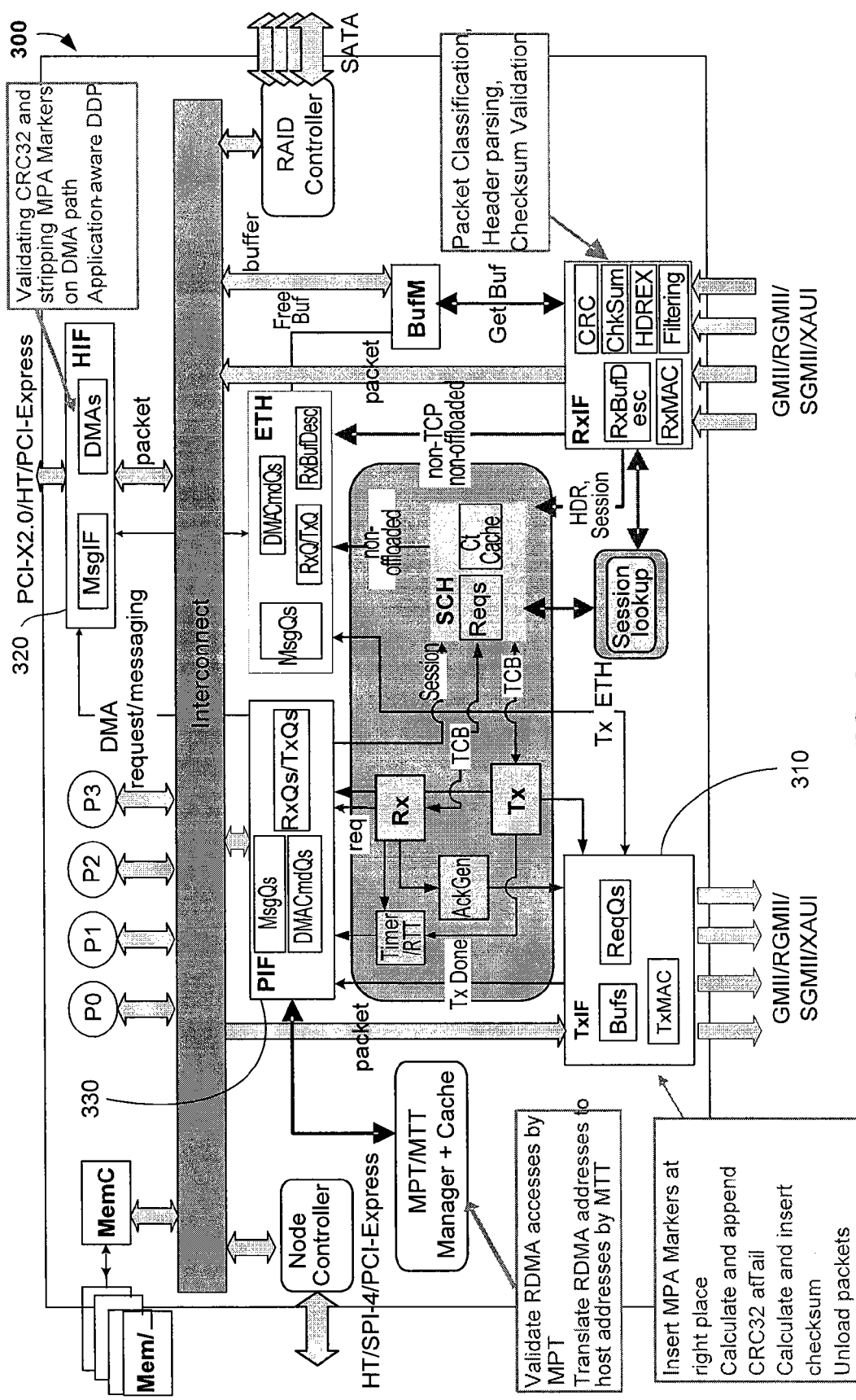
FIG. 3 is a block diagram of the invention as it could be implemented in the form of an integrated circuit.

The invention described herein is an apparatus that efficiently calculates the locations of MPA markers and RDMA CRCs, and inserts and removes them from a data stream. The invention can be a part of an RNIC, and can be embodied in an integrated circuit therein. FIG. 3 demonstrates the architecture of an ASIC that supports RDMA according to an embodiment of the invention. The illustrated design facilitates the insertion and removal of MPA markers and CRCs on the DMA paths by a transmit interface (TxIF) 310 and a host interface (HIF) module 320 respectively. The operation of these modules is coordinated in part by commands stored in a processor interface (PIF) 330.

Processor Interface (PIF)

Figure 4:
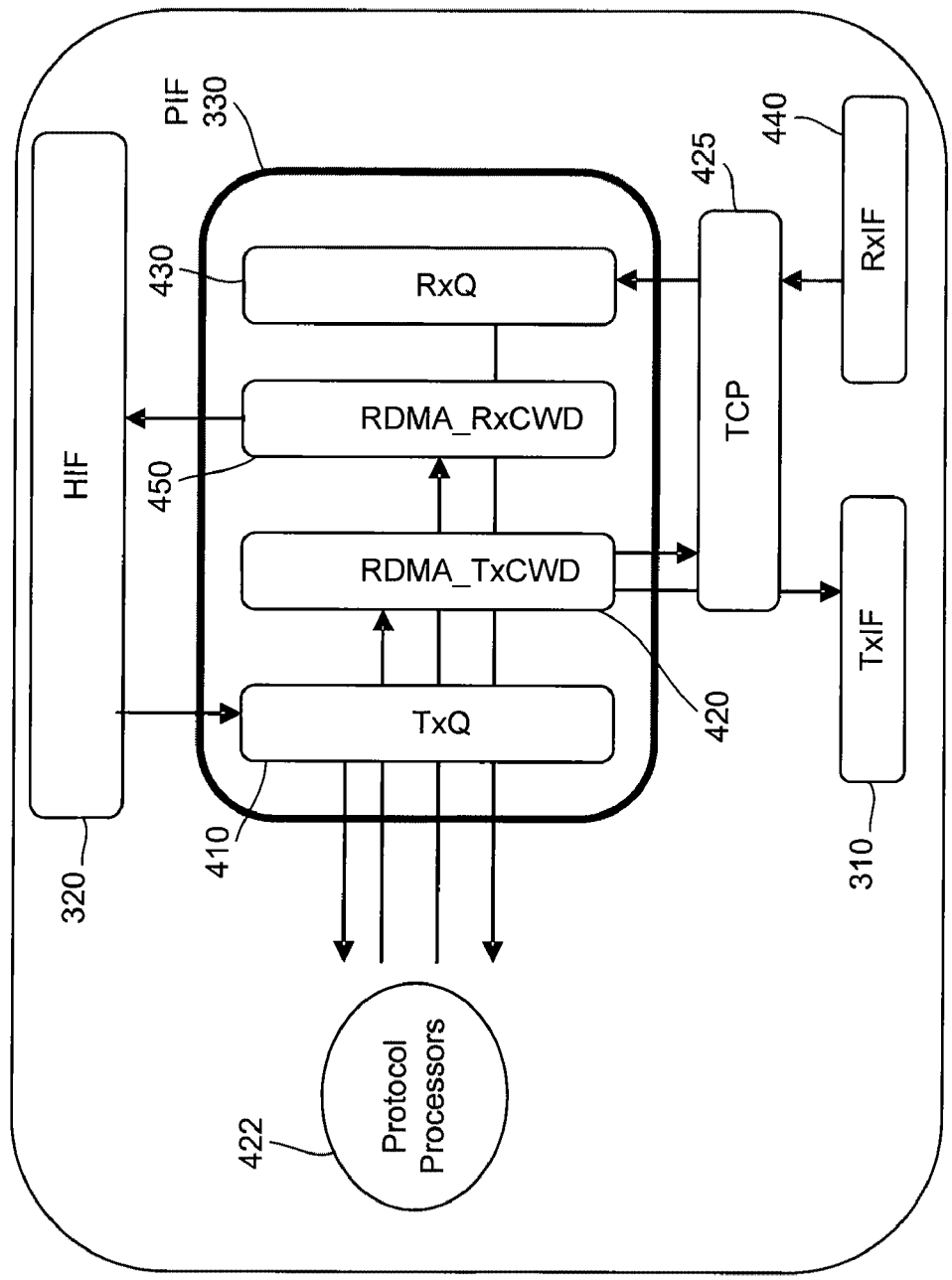
FIG. 4 illustrates a processor interface, according to an embodiment of the invention.

The processor interface, an embodiment of which is shown in FIG. 4, contains a set of command queues.

TxQ 410 is a command queue for accepting data transmitting requests.

RDMA_TxCWD 420 is a queue where a protocol processor (one of protocol processors 422) inserts commands for directing the TCP engine 425 and the TxIF 310 to frame application data and send out RDMA packets.

RxQ 430 is an input queue to one or more protocol processors 422. It keeps indications from the receive interface (RxIF) 440 regarding received packets.

Protocol processors 422 receive packets via the RxQ 430. After RDMA processing, the protocol processors 422 add commands to the RDMA_RxCWD queue 450. These commands guide the DMA engines in host interface (HIF) 320 to move received packet data to designated host memory locations.

Host Interface (HIF)

Figure 5:
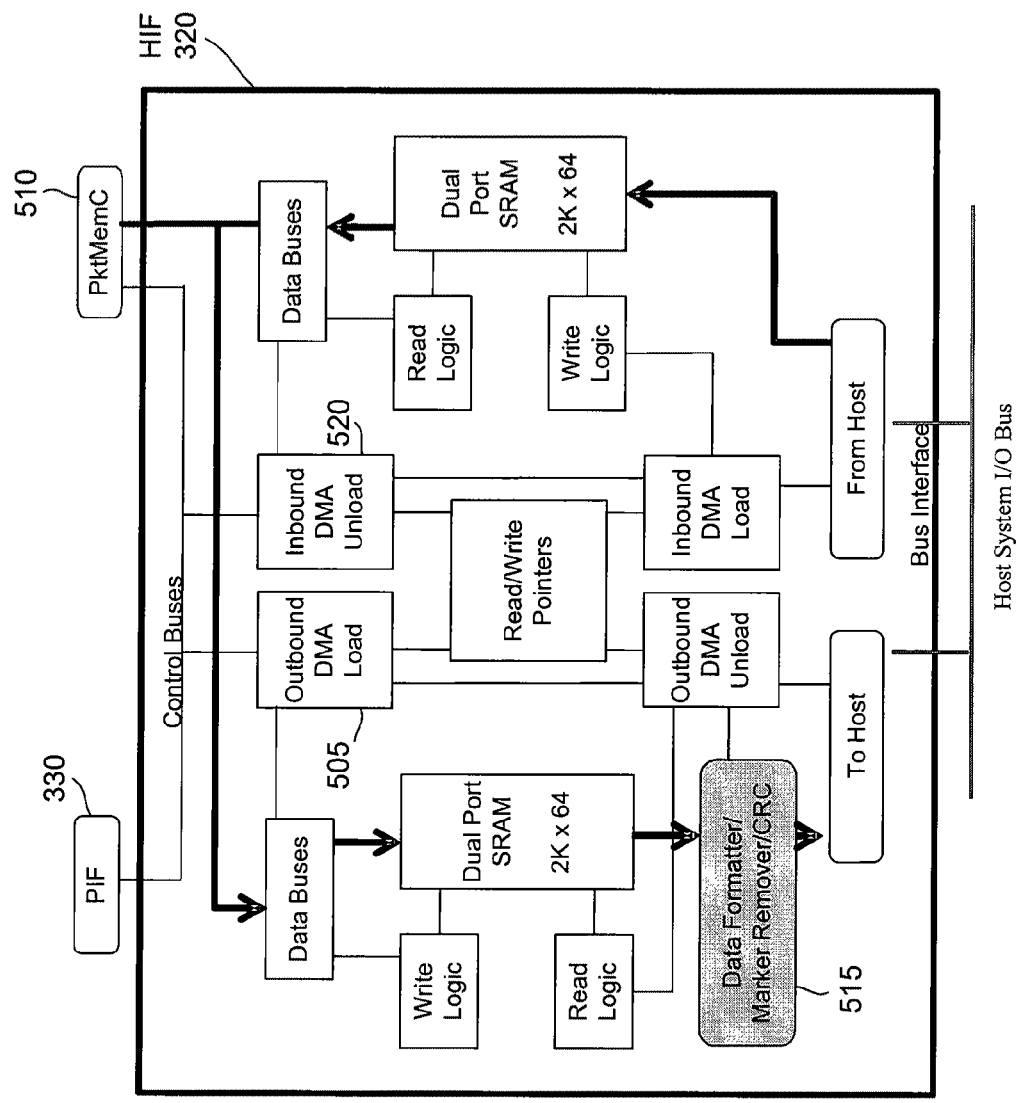
FIG. 5 illustrates a host interface, according to an embodiment of the invention.

FIG. 5 shows a block diagram of the host interface module 320, according to an embodiment of the invention.

When passing received data to the host, an outbound DMA engine 505 accepts commands from command queue RDMA_RxCWD 450 in the processor interface module 330. The outbound DMA engine 505 fetches packet data from the packet memory via a packet memory controller 510. Note that engine 505 is referred to here as an "outbound" engine because it is processing data that is outbound from an RNIC, even though the data is ultimately inbound to a host.

The outbound DMA engine 505 moves data through a data formatter 515, which calculates the correct MPA marker locations and removes the markers from the byte stream. In parallel, the data formatter 515 calculates the RDMAP CRC for validation purposes.

Command words in each entry of the RDMA_RxCWD queue 450 contain the following formation:
   Address of the local (source) buffer, where the received packets are stored,
   Address of the destination (host) buffer,
   Number of bytes to copy from local buffer to host buffer,
   Starting TCP sequence number for the very first byte of source data,
   RDMA initial receive sequence number (rdma_irs).

The data formatter 515 will take out every data byte whose sequence number equals (rdma_irs+n*512+k), where n is an integer and k ∈ {0,1,2,3}. In other words, 4-byte MPA markers are inserted at a 512 bytes stride, starting at the sequence number rdma_irs.

Transmit Interface (TxIF)

Figure 6:
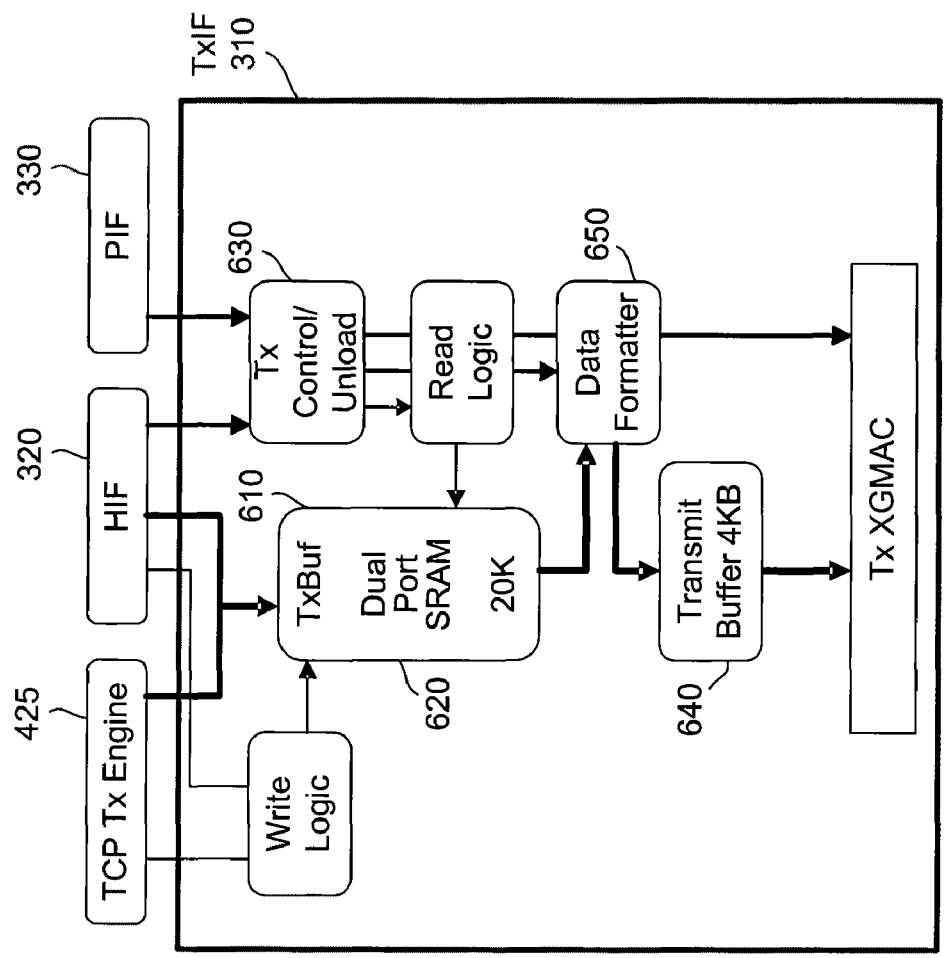
FIG. 6 illustrates a transmit interface, according to an embodiment of the invention.

When the host application is to send data, the host application writes a request to the queue TxQ 410 in PIF 330 (see FIGS. 3, 4). Referring to FIGS. 4 and 6, the protocol processors 422 will then allocate a buffer TxBuf 610 from a SRAM block 620 in the TxIF 310.

The protocol processors 422 then direct the TCP Tx engine 425 to prepare and write TCP/IP headers to the allocated buffer TxBuf 610, and instruct the inbound DMA engine 520 in HIF 320 to copy outgoing data from the host buffer into TxBuf 610. The protocol processors 422 also write an RDMA header to the allocated buffer TxBuf 610.

Figure 7:
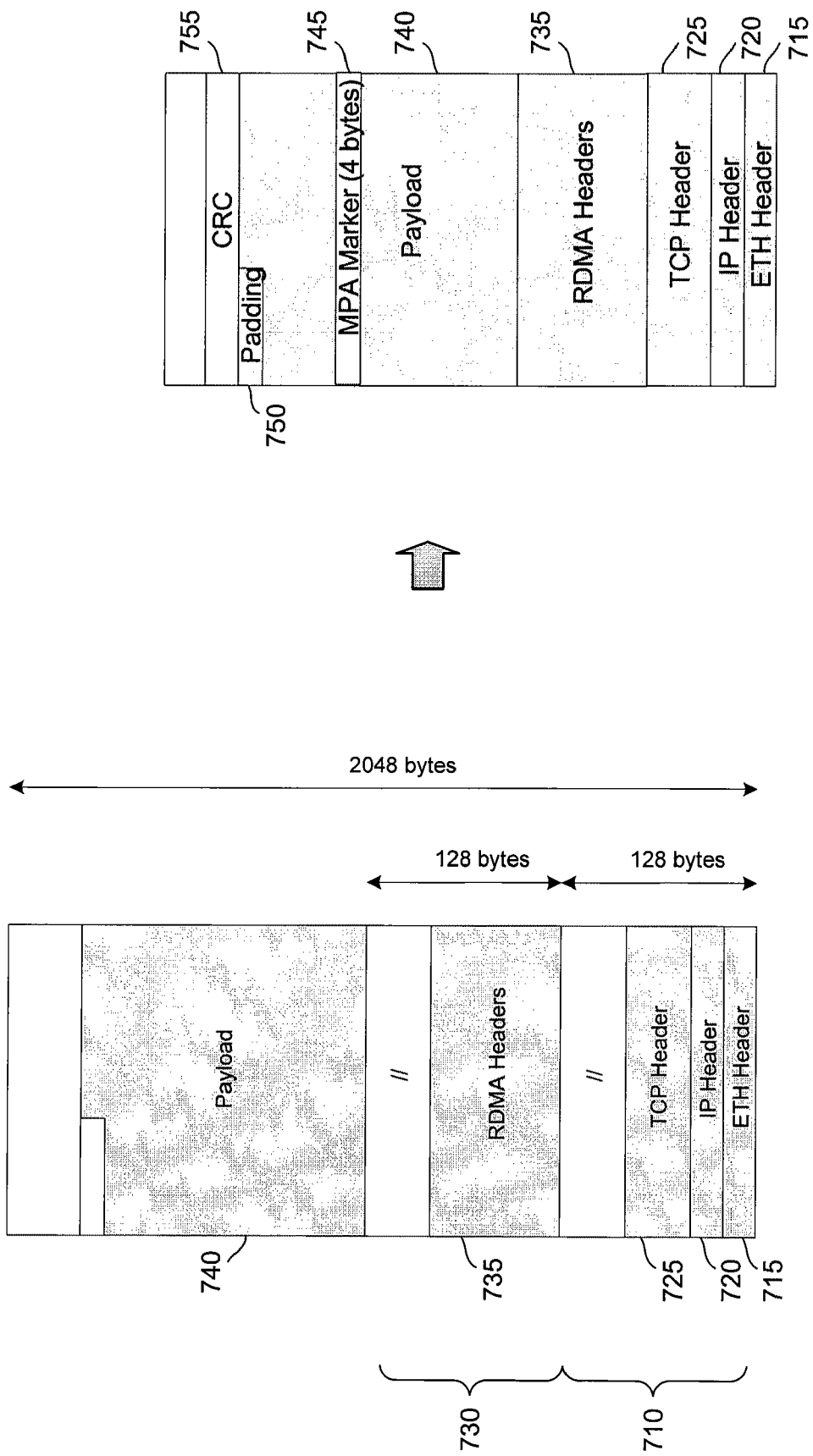
FIG. 7 illustrates a packet format before and after processing by a data formatter, according to an embodiment of the invention.

In an embodiment of the invention, a transmit packet in the TxBuf 610 has the layout shown on the left in FIG. 7. In the illustrated embodiment, each TxBuf is 2 KB in size. When one of the protocol processors 422 issues a transmit request, the protocol processor allocates a TxBuf. The first 256 bytes will be reserved. The TCP Tx engine 425 will fill the first 128-byte region 710 with an ethernet header 715, an IP header 720, and a TCP header 725. The protocol processor will fill the next 128-byte region 730 with RDMA protocol headers 735.

In the embodiment shown, packet payload 740 starts at the point that is 256 bytes offset from the beginning of the TxBuf 610. The destination address of a Tx command word given to the inbound DMA engine 520 in HIF 320 is always set to the address of the TxBuf plus 256. The reason for this offset up is that the TCP Tx engine 425 does not understand RDMA headers. Moreover, the size of RDMA headers is not necessarily a constant.

After HIF 320 has completed copying data from the source host data buffer into the TxBuf 610, HIF 320 will signal the transmit control/unload logic 630 of the Tx interface 310. Tx interface 310 then directs its transmit control/unload logic 630 to read the packet out of the TxBuf 610 into the transmit buffer 640. Along this path, a data formatter 650 will "pack" the data byte stream, resulting in the format shown on the right of FIG. 7. The gap between the TCP header 725 and RDMA headers 735 is removed; likewise the gap between RDMA headers 735 and payload 740 is removed. Furthermore, the data formatter 650 will insert MPA markers into the packet at the right positions (such as marker 745), add padding 750 to ensure the packet ends at a word-aligned boundary, calculate and append a CRC 755, and finally calculate the checksum for the TCP/IP headers.

This is achieved by the following:
   TCP engine 425 provides the TCP/IP header length information.
   The protocol processor provides the following information:
      the RDMA header length information,
      the length of the payload to transfer, the starting TCP sequence number (sseq) for the very first byte of the outgoing TCP packet,
the initial RDMA send sequence number (rdma_iss).
From the length information, the data formatter 650 can gather necessary data. Starting with the sequence number rdma_iss, data formatter 650 will insert a marker, four bytes in length, at a stride of every 512 bytes. Thus, the very first marker should be inserted after the n-th bytes, where $$n=512-|rdma\_iss-(sseq \bmod 512)|$$

Afterwards, a marker is inserted at every 512-byte stride.

Conclusion

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

What is claimed is:

1. A method for removing aligned framing protocol (MPA) markers in packet data streams that are inbound, from a host, to a host interface in communication with the host, comprising:
   receiving, at the host interface, commands from a processor interface in communication with the host interface, the commands configured to direct processing of inbound packet data, including
      receiving, at the host interface, the inbound packet data having an MPA marker;
      calculating, by the host interface, a location of the MPA marker in the inbound packet data based on a sequence number included in the commands from the processor, the sequence number being associated with the location of the MPA marker; and
      removing, by the host interface, the MPA marker from the inbound packet data based on the calculating the location of the MPA marker.

2. The method of claim 1, wherein the processing of inbound packet data further comprises:
   determining, by the host interface, locations of remote direct memory access (RDMA) cyclic redundancy codes (CRCs) in the inbound packet data; and
   validating and removing, by the host interface, the RDMA CRCs from the inbound packet data.

3. The method of claim 1, further comprising:
   queuing the commands configured to direct processing of inbound packet data in a plurality of command queues of the processor interface.

4. The method of claim 3, wherein said queuing comprises:
   accepting protocol processor commands, configured to direct the host interface to move received inbound packet data to designated host memory locations, in an RDMA receive queue.

5. The method of claim 1 wherein said determining and removing, by the host interface, comprises determining and removing by a data formatter of the host interface.

6. The method of claim 1, wherein calculating the locations of the MPA markers comprises:
   determining data byte sequence numbers according to the formula:

$$rdma\_irs+(n*512)+k$$

for each $k \in \{0, 1, 2, 3\}$, where n is an integer, and rdma_irs is an RDMA initial receive sequence number and is the sequence number included in the commands from the processor.

7. The method of claim 6, wherein the sequence number indicates a location of a data byte associated with the MPA marker.

8. A remote direct memory access (RDMA) transmit interface configured to insert marker PDU aligned framing protocol (MPA) markers in packet data streams that are outbound to a host, comprising:
   an allocated buffer configured to receive outbound packet data;
   a transmit interface data formatter configured to read the outbound packet data from the allocated buffer, to calculate a position for an MPA marker in the outbound packet data based on a sequence number included in commands received from a processor, the sequence number being associated with the position for the MPA marker, and to insert the MPA marker in the calculated position in the outbound packet data; and
   a transmit buffer configured to receive the processed outbound packet data including the MPA marker from the transmit interface data formatter, wherein
   the transmit interface is configured to receive commands configured to direct the allocated buffer, the transmit interface data formatter, and the transmit buffer to process the outbound packet data.

9. The transmit interface of claim 8, wherein the transmit interface is configured to receive commands from a plurality of command queues configured to queue commands that direct the processing of the outbound packet data.

10. The transmit interface of claim 9, wherein the plurality of command queues comprises:
    an RDMA transmission queue configured to accept protocol processing commands configured to direct the transmit interface to send outbound packet data.

11. The transmit interface of claim 8, wherein the allocated buffer comprises:
    a first reserved region configured to receive an ethernet header, an IP header, and a TCP header of the outbound packet data from a TCP transmit engine in communication with the transmit interface; and
    a second reserved region configured to receive RDMA headers of the outbound packet data from a protocol processor in communication with the transmit interface.

12. The transmit interface of claim 11, wherein the allocated buffer further comprises:
    a packet payload region configured to receive a packet payload of the outbound packet data, a starting point of the packet payload region in the allocated buffer being offset from the beginning of the allocated buffer by the first reserved region and the second reserved region of the allocated buffer.

13. The transmit interface of claim 12, wherein
    the transmit interface data formatter is further configured to pack the outbound packet data by removing a first data gap between an end of the TCP header of the first reserved region and a start of the second reserved region, and
    the transmit interface data formatter is further configured to pack the outbound packet data by removing a second data gap between an end of the RDMA headers of the second reserved region and a start of the packet payload region.

14. The transmit interface of claim 13, wherein the calculated position in the outbound packet data for the MPA marker includes a position in the packet payload of the packed outbound packet data such that the transmit interface data formatter is configured to insert the MPA marker in the packet payload region.

15. The transmit interface of claim 14, wherein the transmit interface data formatter is configured to add padding at an end of the packet payload of the packed outbound packet data such that the packed outbound packet data ends at a word-aligned boundary.

16. The transmit interface of claim 15, wherein the transmit interface data formatter is configured to calculate and append a cyclic redundancy code (CRC) to the packet payload and padding.

17. The transmit interface of claim 16, wherein the transmit interface data formatter is configured to calculate a checksum for the TCP and IP headers.

18. The transmit interface of claim 8, wherein the transmit interface data formatter inserts the MPA marker every 512 bytes, where a first MPA marker is inserted after the nth byte, where $$n=512-|\text{rmda\_iss}-(\text{sseq} \bmod 512)|$$

where rdma_iss is an initial rdma send sequence number and is the sequence number included in the commands from the processor, and sseq is a starting transmission control protocol (TCP) sequence number for a first byte of an outgoing TCP packet.

19. A method for inserting marker PDU aligned framing protocol (MPA) markers in packet data streams that are outbound to a host in communication with a host interface, comprising:
   receiving, at a transmit interface in communication with the host interface and a processor interface, commands from the processor interface configured to direct processing of outbound packet data, including
      receiving, at the transmit interface, the outbound packet data from the host interface;
      calculating a position for an MPA marker in the outbound packet data based on a sequence number included in the commands from the processor, the sequence number being associated with the position for the MPA marker; and
      inserting the MPA marker in the calculated position in the outbound packet data.

20. The method of claim 19, wherein processing of outbound packet data further comprises:
   determining positions in outbound packet data for RDMA CRCs; and
   inserting the RDMA CRCs in the calculated positions in the outbound packet data.

21. The method of claim 19, further comprising:
   queuing the commands configured to direct processing of outbound packet data in a plurality of command queues of the processor interface.

22. The system of claim 21, wherein said queuing comprises:
   accepting data transmitting requests, from said host interface, in a transmit queue; and
   accepting protocol processor commands, configured to direct the transmit interface to send outbound packet data, in an RDMA transmission queue.

23. The method of claim 19, wherein calculating the location of the MPA marker comprises determining data byte sequence numbers according to the formula:

$$\text{rdma\_irs}+(n*512)+k$$

for each k ∈ {0, 1, 2, 3}, where n is an integer, and rdma_irs is an RDMA initial receive sequence number and is the sequence number included in the commands from the processor.

24. The method of claim 19, wherein the sequence number indicates a location of a data byte associated with the MPA marker.

25. The method of claim 19, wherein inserting comprises inserting, by a transmit interface data formatter of the transmit interface, the MPA marker into the outbound packet data.

26. The method of claim 25, wherein inserting, by the transmit interface data formatter, comprises inserting the MPA marker every 512 bytes, where a first MPA marker is inserted after the nth byte, where $$n=512-|\text{rmda\_iss}-(\text{sseq} \bmod 512)|$$

where rdma_iss is an rdma initial send sequence number and is the sequence number included in the commands from the processor, and sseq is a starting transmission control protocol (TCP) sequence number for a first byte of an outgoing TCP packet.

* * * * *

UNITED STATES PATENT AND TRADEMARK OFFICE
CERTIFICATE OF CORRECTION

PATENT NO. : 8,166,127 B2
APPLICATION NO. : 12/534429
DATED : April 24, 2012
INVENTOR(S) : Fong Pong Page 1 of 1

It is certified that error appears in the above-identified patent and that said Letters Patent is hereby corrected as shown below:

Column 8, line 35, please replace "512bytes" with --512 bytes--.

Signed and Sealed this
Third Day of July, 2012

David J. Kappos
*Director of the United States Patent and Trademark Office*